United States Patent
Fabbri et al.

(10) Patent No.: US 8,206,269 B2
(45) Date of Patent: Jun. 26, 2012

(54) MONITORING APPARATUS FOR A GYMNASTIC MACHINE

(75) Inventors: Gianmatteo Fabbri, Rimini (IT); Jarno Guidi, Cesena (IT); Mauro Fabbri, Savio (IT)

(73) Assignee: Technogym S.p.A., Gambettola (FC) (IT)

( * ) Notice: Subject to any disclaimer, the term of this patent is extended or adjusted under 35 U.S.C. 154(b) by 0 days.

(21) Appl. No.: 13/315,787

(22) Filed: Dec. 9, 2011

(65) Prior Publication Data

US 2012/0094805 A1    Apr. 19, 2012

Related U.S. Application Data

(62) Division of application No. 12/850,111, filed on Aug. 4, 2010, now Pat. No. 8,075,450.

(30) Foreign Application Priority Data

Aug. 4, 2009 (IT) .................................. RA09A0026

(51) Int. Cl.
*A63B 71/00* (2006.01)

(52) U.S. Cl. .......................................................... 482/8

(58) Field of Classification Search .................. 482/1–9, 482/54, 148, 900–901; 348/77, 169–172, 348/208.14, 208.4; 434/247, 252, 255; 600/300, 587, 595; 73/865.4; 396/153, 429; 382/128, 154; *A63B 71/00*

See application file for complete search history.

(56) References Cited

U.S. PATENT DOCUMENTS

| | | | | |
|---|---|---|---|---|
| 4,416,293 | A * | 11/1983 | Anderson et al. | 600/595 |
| 6,231,527 | B1 * | 5/2001 | Sol | 600/595 |
| 7,060,008 | B2 * | 6/2006 | Watterson et al. | 482/54 |
| 7,907,176 | B2 * | 3/2011 | Hayashi | 348/208.7 |
| 7,917,935 | B2 * | 3/2011 | McAlpine et al. | 725/105 |
| 8,075,450 | B2 * | 12/2011 | Fabbri et al. | 482/8 |
| 2006/0189902 | A1 * | 8/2006 | Takai et al. | 600/595 |
| 2007/0275830 | A1 * | 11/2007 | Lee et al. | 482/54 |

* cited by examiner

*Primary Examiner* — Oren Ginsberg

(74) *Attorney, Agent, or Firm* — Abelman, Frayne & Schwab

(57) ABSTRACT

Apparatus and method for monitoring a body portion of a user during the use of a gymnastic machine provided with a video monitoring apparatus; this method comprising a phase of defining the body portion to be monitored, followed by a phase of visually and continuously monitoring this body portion through the video monitoring apparatus; this last phase comprising a sub-phase of synchronizing the trend over time of the value of at least one operating parameter of the video monitoring apparatus with a motion of the body portion described on the basis of given kinematic information acquired by a control unit of the gymnastic machine.

4 Claims, 2 Drawing Sheets

Fig. 1
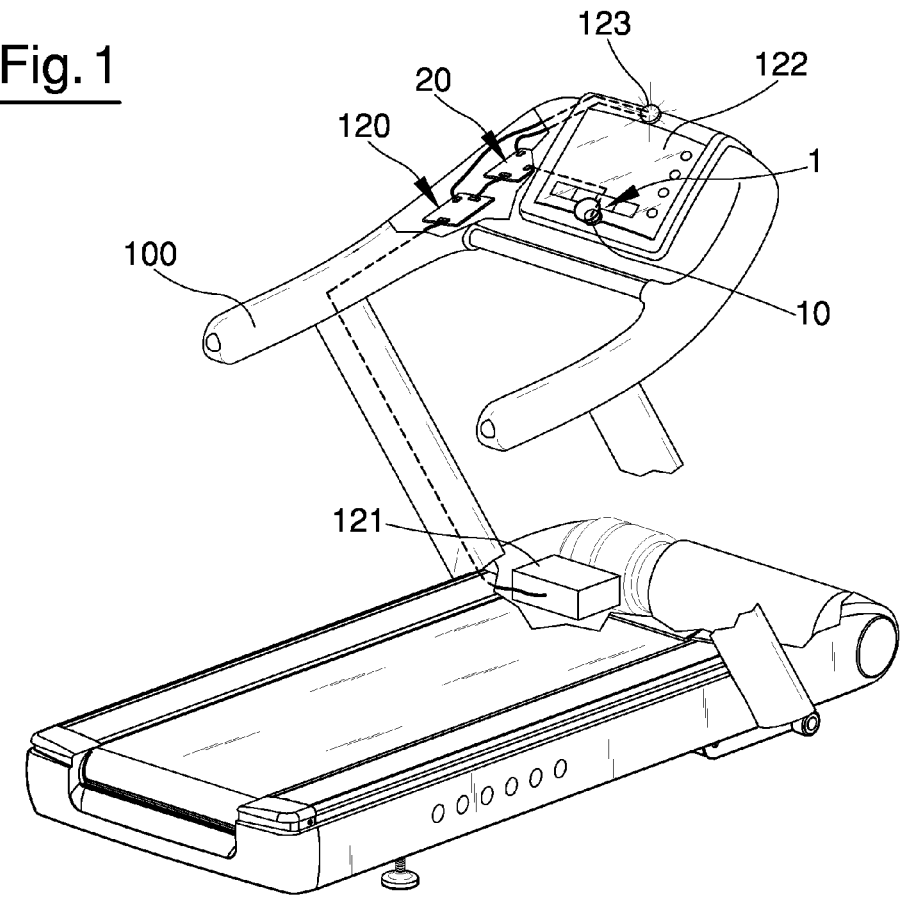
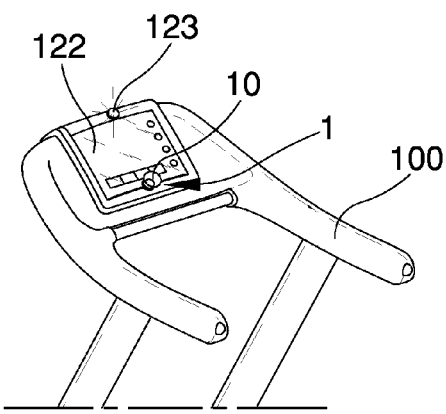
Fig. 2A
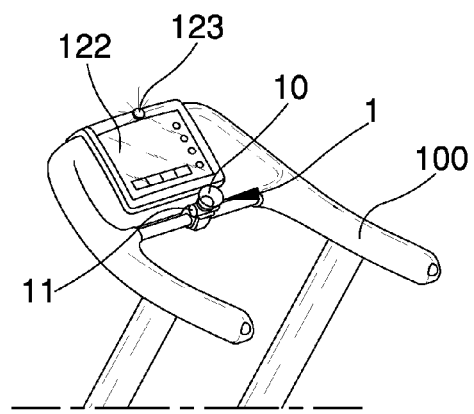
Fig. 2B

MONITORING APPARATUS FOR A GYMNASTIC MACHINE

CROSS-REFERENCE TO RELATED APPLICATIONS

This is a divisional application of application Ser. No. 12/850,111 filed Aug. 4, 2010, now U.S. Pat. No. 8,075,450 which claims priority under 35 USC 119 to Italian Application No. RA2009A000026, filed Aug. 4, 2009.

FIELD OF THE INVENTION

The present invention relates to a video monitoring apparatus and method. More in particular, the present invention relates to a video monitoring method that can be used on a gymnastic machine provided with a respective video monitoring apparatus. More in particular, the present invention relates to a method for visually and continuously monitoring at least one moving body portion of a user of a gymnastic machine during the execution of respective physical exercises.

BACKGROUND TO THE INVENTION

Recently, in the field of fitness and sport practice performed through gymnastic machines, the interest has been developed in providing gymnastic machines with respective video filming apparatuses, for visually and continuously monitoring a user during the execution of respective gymnastic exercises. These video filming apparatuses are usually constituted by an electro-optical filming device, for example a digital camera or an infrared sensor, and by a respective programmable control electronics allowing to set and adjust operating parameters of video filming and giving, typically in digital format and in real time, the flow of video data output from the filming device. The purpose of providing gymnastic machines with respective video filming apparatuses is that of visually and continuously monitoring at least one body portion, for example the face, of the user during the execution of gymnastic exercises. More in particular, the use of a digital camera or a webcam to frame the face of a user of gymnastic machine can allow him/her to perform live video-calls or videoconferences/video-chats during training. This opportunity is particularly desirable during prolonged cardiovascular training sessions, during which a user, in addition to reading or listening to music, could be interested to communicate with other people.

Alternatively, the opportunity of monitoring, during training, the face or another body portion of a user of a gymnastic machine through specific cameras or opto-electronic sensors, for example infrared sensors, allows to acquire in real time biometric information about the user, for example his/her heart rate.

However, it should be noted that, independently of the purpose of the visually and continuously monitoring of a given body portion of a user during training, the video monitoring apparatuses currently available on the market, and their respective algorithms for tracking a moving object, present limits that do not allow a satisfactory use thereof in the sector of gymnastic machines. In fact, during a training session with a gymnastic machine the face and the other body portions of a user continuously move, and are therefore movable also inside the visual field of the filming device or they can also exit it, thus making literally impossible a continuous monitoring of the body portion. In this regard, with reference to the common digital cameras available on the market, it should be noted that algorithms are known for digital analysis of the images, that allow to detect, and also to emphasise, the face of the filmed subject; however these algorithms usually require at least some tenths of a second to analyse a single image, and they cannot therefore be used to analyse a film, i.e. a series of frames in rapid succession, with a speed sufficient to track a face moving inside the visual field of the films.

Consequently, by providing a gymnastic machine with a video monitoring apparatus among those currently available on the market, it is not possible to monitor continuously and in real time a face or another body portion of a user, as the generally available control electronics of the video filming device and the algorithms for analysing the images are not suitable to track stably and in real time this body portion during the execution of the training session. As a result, this instability in tracking the body portion does not allow the body portion to be displayed correctly in real time, and does not allow a correct evaluation of the biometric parameters of the user during training.

In view of the situation described above, the problem of performing, continuously and substantially in real time, a video monitoring of a moving body portion of a user of a gymnastic machine during a respective training session, is therefore currently unsolved. In this regard, it would be desirable to have available a video monitoring method that can be implemented through any video monitoring apparatus associated with a gymnastic machine for visually and continuously monitoring a body portion of a user of the gymnastic machine during the execution of physical exercises. More in particular, it would be desirable to have available a video monitoring method that allows tracking, effectively and stably over time, a moving body portion so that this latter is constantly framed substantially in the centre of the visual field of the used monitoring apparatus.

SUMMARY OF THE INVENTION

The present invention relates to a monitoring method. More in particular, the present invention relates to a video monitoring method. More in particular, the present invention relates to a video monitoring method that can be used on a gymnastic machine provided with a respective video monitoring apparatus. More in particular, the present invention relates to a method for continuously monitoring at least one body portion of a user of a gymnastic machine during the execution of respective physical exercises.

An object of the present invention is to provide a video monitoring method that can be implemented through a video monitoring apparatus connected to a gymnastic machine, and can be used to monitor continuously a moving body portion of a user of this gymnastic machine during execution of respective physical exercises. This monitoring method allows the disadvantages described above to be solved and is therefore suitable to satisfy a plurality of requirements that to date have still not been addressed, and therefore suitable to represent a new and original source of economic interest, capable of modifying the current market of fitness equipment and, more in general, of gymnastic machines.

According to the present invention a method is provided for video monitoring a moving body portion of a user of a gymnastic machine, and the main characteristics of this method will be described in at least one of the appended claims.

A further object of the present invention is to provide a video monitoring apparatus designed to be used in combination with a gymnastic machine for visually and continuously monitoring a body portion of a user of this gymnastic machine.

According to the present invention, a monitoring apparatus is provided, whose main characteristics will be described in at least one of the appended claims.

A further object of the present invention is to describe a use of a video monitoring apparatus in combination with a gymnastic machine for visually and continuously monitoring at least one body portion of a user of this gymnastic machine.

According to the present invention, a use is illustrated for a video monitoring apparatus: the main characteristics of this use will be described in at least one of the appended claims.

BRIEF DESCRIPTION OF DRAWINGS

Further characteristics of the video monitoring apparatus and of the respective monitoring method according to the present invention will be more apparent from the description below, set forth with reference to the accompanying drawings, which illustrate some non-limiting examples of embodiment, in which identical or corresponding parts of the apparatus are identified by the same reference numbers. In particular:

FIG. 1 is a perspective schematic view of a gymnastic machine provided with a video monitoring apparatus according to the present invention;

FIG. 2a illustrates a detail of the video monitoring apparatus of FIG. 1 according to a first embodiment;

FIG. 2b illustrates a detail of the video monitoring apparatus of FIG. 1 according to a second embodiment;

DETAILED DESCRIPTION OF THE PRESENT INVENTION

Figure 3:
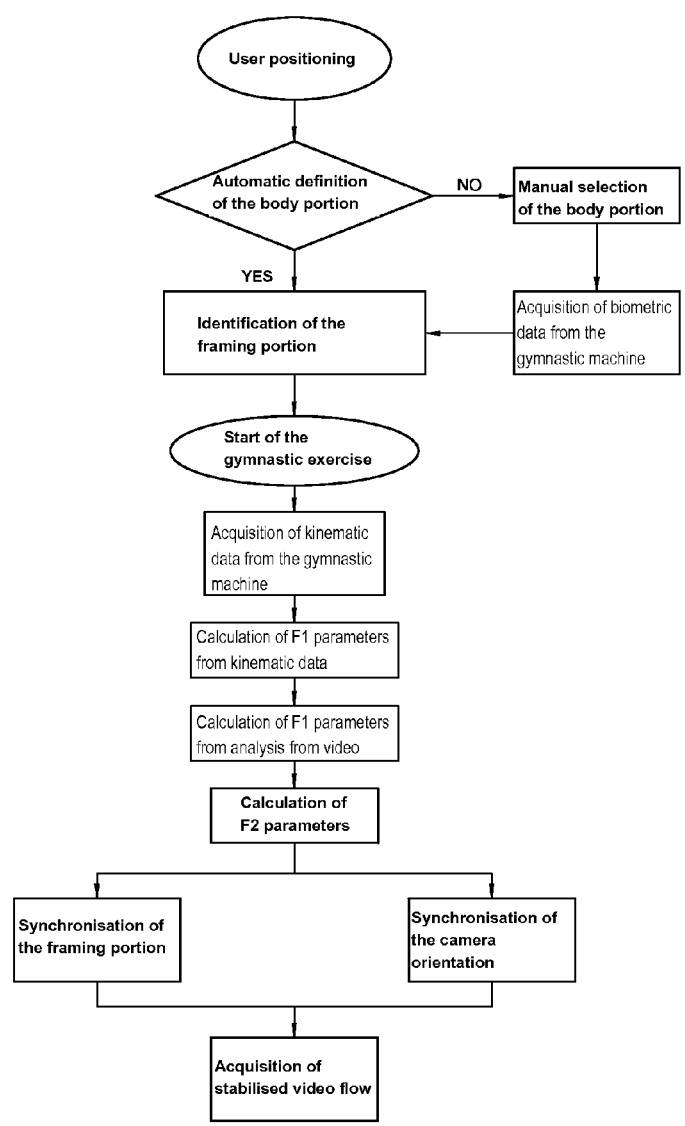
FIG. 3 illustrates a flow diagram relating to a preferred embodiment of the video monitoring method according to the present invention.
Figure 4:
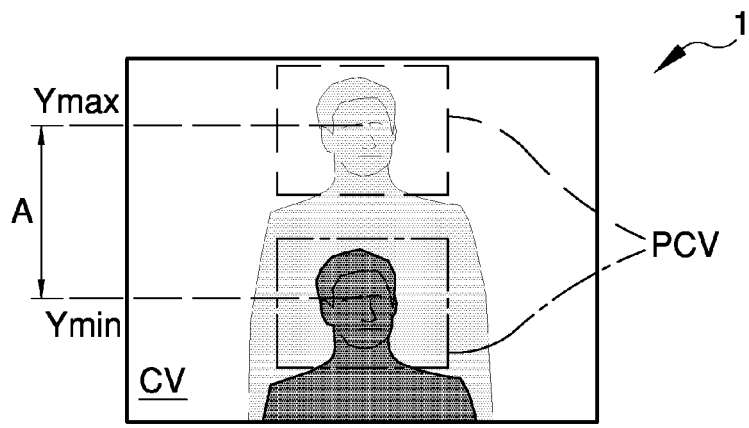
FIG. 4 illustrates an example of the video parameters which can be captured by the video monitoring apparatus according to the movement of the user's face.

In FIG. 1 number 1 indicates, in its entirety, a video monitoring apparatus connected to a gymnastic machine 100 and designed to film a user during training on this gymnastic machine 100. In particular, the video monitoring apparatus 1 comprises at least one opto-electronic video filming device 10, preferably of the digital type, suitable, in use, to film at least one body portion of a user in training on the gymnastic machine 100. In more detail, this video filming device 10 comprises preferably, although without limitation, a digital camera 10 or a webcam 10 designed to supply, substantially in real time, a continuous flow of video data output about what has been filmed. The video filming device 10 can alternatively comprise an infrared sensor or any other type of opto-electronic sensor of the known type suitable, in use, to supply, substantially in real time, a flow of video data output, preferably of the digital type, representing what has been filmed by this video filming device 10.

At this point, with particular reference to FIGS. 2a and 2b, it should be noted that the video filming device 10 can be of the fixed type and present a respective visual field CV dimensioned so as to frame a part of the user's body of significant dimensions and, anyway, of dimensions greater than the given body portion that one desires to monitor during training. In this way, even if this body portion to be monitored will move during the use of the gymnastic machine 10, the filming device 10 should be however able to frame it inside its visual field CV. Alternatively, as illustrated in FIG. 2b, the video monitoring apparatus 1 can comprise an actuator group 11, provided with one or more actuators of the known type, that is coupled to the video filming device 10 to move and direct it so that, in use, the body portion to be monitored, even if moving, is maintained constantly in a substantially central position of the visual field of the video filming device 10. Just by way of example, it could be advisable to note that, to direct a video filming device 10 of small dimensions, for example a simple opto-electronic sensor presenting a surface of maximum a pair of $cm^2$, it will be possible to use actuators of the type generally used in the CD and DVD players to direct the laser read head.

It should be noted that the video monitoring apparatus 1, and in particular the filming device 10, is preferably dimensioned and shaped so that it can be integrated into the structure of the gymnastic machine 100, for example, as illustrated in FIGS. 2a and 2b, inside a console for controlling and adjusting the operating parameters of the gymnastic machine 100. Alternatively, at least the video filming device 10 can be supported by a wall or by a respective upright so that the intensity of the vibrations, transmitted by the user to the video monitoring apparatus 1 through the frame of the gymnastic machine 100, is minimised.

The video monitoring apparatus 1 further comprises a respective electronic first control unit 20 connected to each video filming device 10 and, as it will be better described hereunder, suitable, in use, both to adjust given operating parameters P of each video filming device 10 and to process electronically the video signal output from the devices 10. This first control unit 20 can be of the known type, for example, although without limitation, a micro PC.

With reference to FIG. 2, it should be noted that the first control unit 20 associated with the video monitoring apparatus 1 is connected to a programmable second control unit 120 associated with the gymnastic machine 100. This second control unit 120 is designed so as to allow the user to set operating parameters of the gymnastic machine 100 to define the characteristics of the exercises he/she wants to perform. Moreover, through a respective first interface 122, for example a keyboard or a touchpad, the user can give the second control unit 120 the value of some of his/her anthropometric characteristics, for example his/her weight or height, that will be preferably stored in a memory associated with the second control unit 120 and can be used to personalise the exercises that can be performed through the gymnastic machine 100.

Lastly it should be noted that, even if not illustrated in the figures, the first and the second electronic control unit 20 and 120 could match each other, and they could be therefore produced through a single programmable computing unit that, in use, will be responsible for managing both the operating training parameters of the gymnastic machine 100 and operating parameters P of the video monitoring apparatus 1, and, in case, the digital processing of the video data output from the video filming device 10. Again with reference to the second control unit 120, it should be noted that this latter can be preferably connected to at least one respective sensor 121 suitable, in use, to monitor continuously kinematic characteristics of the motion of a second interface 101 designed to allow each user to interact with the machine 100 and with a respective load group, if any, known and therefore not illustrated. For example, with reference to FIG. 1 the illustrated gymnastic machine 100 is an endless belt 100 or a treadmill provided with an endless belt that is carried by at least one pair of rollers and can be interpreted as a second interface 101 for the user of the gymnastic machine 100. In this case, the second control unit 120 can be connected to at least one respective sensor 121, for example a magnetic transducer, designed to provide, in real time, the value of the instantaneous speed of movement of the belt or, in an equivalent manner, the value of the instantaneous speed of rotation of the rollers supporting the belt. Alternatively, a sensor 121 can comprise a pressure sensor designed to measure the evolution over time of the pressure exerted by the feet of the user on the belt and, consequently, to allow the second control unit 120 to calculate, substantially in real time, a frequency w of the step of this user.

At this point, before proceeding with a detailed description of the video monitoring method that can be actuated through the video monitoring apparatus 1 describe above, it should be noted that the choice of representing, in FIGS. 1 and 2, the gymnastic machine 100 as an endless belt 100 provided with a camera 10 has been made just by way of example, and it does not limit the scope of use and of protection of the video monitoring apparatus 1 according to the present invention and of the respective video monitoring method that, contrarily, can be used with gymnastic machines of any type. However, to simplify the description of the video monitoring method according to the present invention, hereinafter reference will be made exclusively to a gymnastic machine 100 constituted by an endless belt 100, such as that illustrated in FIGS. 1 and 2, provided with at least one camera 10. Furthermore, again to simplify the description of the method according to the present invention, and just by way of non-limiting example, reference will be made to a single body portion to be monitored, constituted by the face of the user performing running exercises on the endless belt 100.

At this point, before detailing the phases composing the method, it should be specified that hereinafter the term video monitoring method means a video filming method for filming a given subject, in particular a body portion of the user, this method, implemented on a video monitoring apparatus, allowing to obtain, in real time, a flow of video data, for example a film, wherein the given subject is maintained stably in a respective given framing position, for example in a substantially central portion of the visual field CV associated to the video filming device 10. In this way, the flow of data output from the video monitoring apparatus 1 can be used in any video application requiring that the filmed subject is maintained stably in a respective framing position, for example the application of algorithms of image analysis aimed at evaluating, in real time, biometric characteristics of the monitored subject.

First of all, the video monitoring method according to the present invention comprises a phase of defining the user's body portion, in this case the face, that one desires to monitor visually and continuously. This phase of defining the body portion can comprise a phase of manually selecting a framing portion PCV of the visual field CV of the video filming device 10, framing the body portion in question, the face in this case, in a time instant preferably immediately preceding the start of the training session on the machine 100. Alternatively, the phase of defining the body portion to be monitored can comprise a phase of automatically identifying this body portion by applying an image recognition algorithm to the video data output from the video filming device 10. Anyway, this phase of automatically identifying the body portion to be monitored will be performed in a time instant preceding the start of the training session on the machine 100, so as to allow the image recognition algorithm to work on one or more frames of a video flow wherein the user's face is substantially immovable over time and therefore easy to be recognised. This algorithm can be performed preferably, although without limitation, by the first electronic control unit 20 that comprises a respective known calculating group and receives from the video filming device 10 a flow of raw video data, i.e. data not processed and relating to all the visual field CV. It should be noted that, to facilitate this phase of automatically identifying the body portion to be monitored, the gymnastic machine 100 can be provided with an audio and/or video signalling element 123, for example a LED or an electronic buzzer, designed to attract the user's attention towards a front console of the gymnastic machine, so that the user tends to rotate his/her face towards the camera 10. Consequently, the monitoring method according to the present invention can comprise a phase of attracting the attention of the user of the gymnastic machine 100 through a signalling element 123 of the audio and/or video type, preceding the phase of defining the body portion to be monitored.

At this point, once the phase of defining the body portion to be monitored has been finished, the gymnastic training can start and the body portion in question will start to move according to schemes typical of the training method performed through the gymnastic machine 100. For example, with reference to an endless belt 100, the user's face, when observed frontally from the point of view of the camera 10, will start to move inside the visual field CV with a substantially periodic vertical motion between an upper end $Y_{MAX}$ and a lower end $Y_{MIN}$. This motion can be kinematically approximated with a simple harmonic motion, or, in other words, with a motion described by a periodic circular function, for example a sinusoidal or cosinusoid function or, alternatively, a function equivalent to an integer power of a sine or cosine. For example, hereinafter a first sinusoidal function F1 will be used to describe the motion of the user's face inside the visual field CV associated with the camera 10. This function can be written in the form $F1(t) = Y_{face}(t) = A \cdot \sin(2\pi v \cdot t + \phi_0)$ where:

$Y_{face}$ is the position of the face in the visual field CV;

A is the amplitude of oscillation of the face in the visual field CV, equivalent to $Y_{MAX} - Y_{MIN}$;

v is the oscillation frequency of the user's face;

$\phi_0$ is the starting phase of the oscillation.

Consequently, knowing these parameters A, v and $\phi_0$ it is possible to know, in every time instant t, the position of the user's face inside the visual field CV and therefore to foresee how this face will move whilst the user executes a running training session. It is therefore clearly apparent that, synchronising a given operating parameter P associated to the operations of video filming performed through the video monitoring apparatus 1 with the assumed values of the first function F1, and therefore with the real motion of the user's face relative to the frame of the gymnastic machine 100, it will be possible to monitor stably over time the user's face, and therefore provide a flow of video data wherein it is possible to detect, in each respective frame, the user's face, substantially in real time.

For instance, by knowing a priori the position of the face in the instant t, thanks to the first sinusoidal function F1, it will be possible to direct the video filming device 10 through a respective actuator group 11 so that it frames the user's face constantly in the centre of its visual field CV. Alternatively, if one desires to use a fixed video filming device 10, knowing the first function F1 will allow to move the framing portion PCV of the visual field CV so that it frames constantly in its centre the user's face. At this point, during processing in real time the raw signal output from the video filming device 10, it will be sufficient to "cut" or emphasise digitally in each frame the framing portion PCV of the visual field CV to obtain a video data flow wherein the user's face is stably in a substantially central position of each frame. In this regard, it should be noted that both the solution of physically directing the video filming device 10 and the solution of varying the position on the framing portion PCV inside the respective visual field CV, in a manner substantially synchronous with the movements of the user's face, can be interpreted as operations of tracking the user's body portion one desires to monitor visually substantially in real time. At this point, in view of the above description with reference to the video monitoring method according to the present invention, it should be specified that, once the phase of defining the body portion to be monitored has been ended, a phase occurs of acquiring from the second control unit 120 of the gymnastic machine 100 information of kinematic nature related to the gymnastic exercise performed at that moment by the user. This information of kinematic nature can comprise, for example, although without limitation, a speed V or a frequency ω of execution of the gymnastic exercise by the user. Starting from these data, the first control group 20, or any other calculating unit associated with the video monitoring apparatus 1, can perform the phase of calculating the frequency ν of the first function F1 hat generally matches an integer multiple of the frequency ν or of the speed V of execution of the gymnastic exercise performed by the user of the gymnastic machine 100.

The monitoring method according to the present invention further comprises a phase of automatically calculating at least one parameter of the first function F1 starting from the processing of the flow of raw video data output from the video filming device 10. This phase can be performed using known image processing algorithms than can be used also to perform the previous phase of automatically identifying the body portion to be monitored. These known algorithms, even if not usable to analyse in real time a video data flow, can be used however to analyse a reduced number of frames in succession or near in the time, in order to identify some kinematic characteristics of the movement of the user's face, for instance a respective initial position $Y_0$ when starting the gymnastic exercise and the end positions $Y_{MIN}$ and $Y_{MAX}$. Starting from these kinematic data obtained by analysing raw video data, the first control unit 20 can perform the phase of calculating further parameters of the first function F1, for example the initial phase $\phi_0$ that can be calculated through the inverse function of the sin applied to the initial position $Y_0$ of the user's face in the visual field CV, or the amplitude A given by the difference between the end positions $Y_{MAX}$ and Ymin of the oscillating motion of the user's face.

At this point, the method according to the present invention comprises a phase of calculating, preferably through the use of the first control unit 20, the first function F1 based upon both the data obtained from the observation of the user's face and the kinematic information given by the second control unit 120 of the gymnastic machine 100. The method for monitoring the user's face further comprises a phase of varying over time the value of at least one given operating parameter P of the video monitoring apparatus 1 according to a respective second periodic function F2 presenting substantially the same frequency ν as the first function F1. Each of these second functions F2 is associated with a respective given operating parameters P associated with the video monitoring apparatus 1 and is calculated starting from the first function F1 associated with the movement of the users face, so that the variation over time of each of these given operating parameters P of the video monitoring apparatus 1 is substantially synchronous with the oscillating movement of the user's face. Therefore, this phase of varying over time the value of at least one given operating parameter P of the video monitoring apparatus 1 according to a respective second periodic function F2 can be interpreted as a phase of synchronising the trend over time of the value of at least one given operating parameter P of the video monitoring apparatus 1 with the movement of the body portion calculated based upon the information of kinematic nature acquired by the second control unit 120 of the gymnastic machine.

At this point it should be noted that these given operating parameters associated with the video monitoring apparatus 1 can comprise for example a position and/or an angle of the video filming device 10 so that the direction of this device 10 varies in real time in a synchronous manner with the oscillation of the users face that, consequently, will be maintained stably in the centre of the visual field of the video filming device 10. In combination with, or alternatively to, what illustrated above, these given operating parameters P of the video monitoring apparatus 1 can comprise a position of the framing portion inside the respective visual field CV. In this way, moving the framing portion with an oscillating motion synchronous with the motion of the users face, this body portion will be maintained stably in the centre of the framing portion PCV.

In any case, independently of the operating parameters P that one desires to vary synchronously with the oscillation of the user's face, it should be noted that the set of the phases of calculating the parameters of the first kinematic function F1, of the phase of calculating the second mathematic function F2 on the basis of at least one parameter of the first function F1, and the phase of synchronising the trend over time of the value of at least one given operating parameter P of the video monitoring apparatus 1 with the second mathematic function F1, and therefore with the motion of the body portion, can be interpreted as a method for tracking a moving body portion of a user of the gymnastic machine 100 during execution of the respective physical exercises.

At this point it should be noted that, if the solution has been chosen of varying the position of the framing portion PCV inside the visual field CV synchronously with the user's face, the monitoring method according to the present invention can comprise a phase of processing the flow of video data output from the device 10, aimed at extracting from each frame only the data related to the framing portion PVC of the visual field CV, so that the flow of video data resulting from this processing is a film substantially composed by frames corresponding to what framed inside the framing portion PCV.

Therefore, in view of the above description, it is clearly apparent that the video monitoring apparatus 1 connected with the gymnastic machine 100 and the respective video monitoring method according to the present invention allow the technical problem in question to be solved, and therefore allow to monitor substantially in real time and in a stable and continuous manner a moving body portion of a user of the gymnastic machine 100 during execution of the respective physical exercises. In this regard it should be noted that, even if there are algorithms for tracking moving objects known and that can be applied to video monitoring systems available on the market, however these tracking algorithms are usually unable to monitor in real time the movement of a body portion of a moving sportsman, as, based upon a real time analysis of the video filming of the motion of the body portion, the evaluation of all the kinematic characteristics of this motion necessary to obtain a correct tracking by the monitoring system is difficult, and characterised by a high degree of approximation. Vice versa, the monitoring method performed according to the present invention comprises a phase of tracking the body portion that is based not only upon a visual evaluation of some kinematic variables of the motion of the subject to be monitored, but above all on the acquisition by the control unit of the gymnastic machine 100 of kinematic data on the gymnastic exercises performed at that moment by the user. The use of these kinematic data allows to obtain a reliable and accurate tacking, as based upon these kinematic data acquired independently of an analysis of a flow of video data collected by the video filming device 10, and are characterised by a high accuracy, and obtained as a result of a substantially direct measurement by the second control unit 120 and at least one respective sensor 121.

What is claimed is:

1. A monitoring apparatus for a gymnastic machine, suitable, in use, to continuously monitor a moving body portion of a user of said gymnastic machine performing physical exercises, said apparatus comprising:

a video filming device;

a first electronic control means for regulating at least one operating parameter of said video filming device, said first electronic control means connected to said video filming device;

said first electronic control means being arranged to acquire, in use, from a second programmable control means of the gymnastic machine kinematic information related to the performance of said physical exercises by said user on said gymnastic machine;

wherein said first control means is arranged to synchronize, on the basis of said kinematic information, a variation over time of the value of said at least one operating parameter with a motion of said body portion, in order to perform, in real-time, stable and accurate tracking of said moving body portion.

2. An apparatus as claimed in claim 1, wherein said video filming device comprises, alternatively or in combination, a digital video-camera, a webcam, an infrared sensor, or a known generic optoelectronic sensor.

3. An apparatus as claimed in claim 1, further comprising an actuator group coupled with said video filming device and connected to said first electronic control means to allow, in use, fine real-time adjustments of the position and/or orientation of said video filming device.

4. An apparatus as claimed in claim 1, wherein said first electronic control means is programmed to acquire from said second programmable control means of said gymnastic machine anthropometric data of said user to facilitate operations for visual recognition and tracking of said body portion.

* * * * *